United States Patent [19]

Goodwin

[11] Patent Number: 4,718,962
[45] Date of Patent: Jan. 12, 1988

[54] SHOWER CURTAIN REPAIR KIT

[76] Inventor: Albert C. Goodwin, 11610 Cleveland Ave., Fort Myers, Fla. 33907

[21] Appl. No.: 23,919

[22] Filed: Feb. 27, 1987

Related U.S. Application Data

[63] Continuation of Ser. No. 725,230, Apr. 19, 1985, abandoned.

[51] Int. Cl.$^4$ .............................................. B32B 31/00
[52] U.S. Cl. .................................. 156/227; 156/247; 156/249; 428/40; 428/137; 428/192
[58] Field of Search ................. 428/40, 131, 137, 343, 428/192, 194; 52/3; 156/247, 249, 227

[56] References Cited

U.S. PATENT DOCUMENTS

| | | | |
|---|---|---|---|
| 1,871,571 | 8/1962 | Weber | 52/3 |
| 3,920,122 | 11/1975 | Koehlinger et al. | 428/43 |
| 4,166,144 | 8/1979 | Amberkar | 428/43 X |
| 4,525,399 | 6/1985 | Fields | 428/137 X |

Primary Examiner—Alexander S. Thomas
Attorney, Agent, or Firm—Alfred E. Wilson

[57] ABSTRACT

There are millions of shower curtains in use in the United States to confine the flow of water used for bathing purposes, and to keep the water from escaping from a bathtub or shower stall and wetting the adjacent floor. Shower curtains are preferably made of waterproof fabric or a plastic material and there are hooks slidably mounted on rods aligned with the front of the tub or shower stall. The top edge of the shower curtain is generally folded over to reinforce it, and the hooks project through holes in the top edge of the shower curtain. Due to the weight of the curtain and the small diameter of the hooks which hold the curtain a high loading is imposed on restricted areas of the curtain aligned with the hooks. The holes become elongated and tear out long before the remaining portions of the average shower curtain is worn out. I have devised a shower curtain protector, preferably consisting of a transparent plastic member adapted to overlie the top edge of the shower curtain and to be adhesively secured to opposite sides of the top edge of the curtain, and having apertures adapted to align with and overlie the apertures in the top edge of the shower curtain. These reinforcements strengthen the area of the curtain that is subjected to the high loading imposed by the narrow hooks in the apertures and thus preserve the shower curtains. These reinforcing members can be applied to shower curtains that have already torn through to rejuvenate the curtains or they can be applied to new curtains or to curtains that have not shown any evidence of wear to preserve them.

1 Claim, 6 Drawing Figures

SHOWER CURTAIN REPAIR KIT

This application is a continuation of U.S. Pat. No. 06/725230 filed Apr. 19, 1985, now abandoned.

BACKGROUND OF THE INVENTION

The need for some way to strengthen and preserve shower curtains in the area of the hook receiving apertures to prevent the apertures from elongating and tearing out the holes through which shower curtains are supported on hooks slidably mounted on bars has long been needed. In the great majority of instances the holes become elongated and break through the fabric long before the shower curtain wears out. Many attempts have been made to prevent the elongation and tearing out of the supporting holes including the use of reinforcement members such as are used to reinforce holes in the edges of papers used in loose leaf notebooks. These efforts have not proven satisfactory because they do not strengthen and protect the areas aligned with the hooks in the upper portions of the apertures where the loading is highest. There are millions of shower curtains and liners in use, hence there is a great need for an improvement that will protect the curtains from tearing out the supporting apertures, and will extend the life of the curtains.

DESCRIPTION OF THE PRIOR ART

Various attempts have been made to provide a reinforcement that will save shower curtains from destruction, but no one has succeeded in providing a simple solution by which the curtain aligned with the hooks in the supporting apertures can be adequately strengthened to preserve them and to extend the life of the shower curtain.

The Patent to Perri U.S. Pat. No. 2,764,501 of Sept. 25, 1956, illustrates a pressure applied reinforcement for protecting apertures in the edges of sheets of paper that have been in use for a long time. Many of those reinforcing pieces have been used on shower curtains in an effort to strengthen the curtain, and to make it possible to use them for longer periods of time. These arrangements have not proven satisfactory primarily because the hooks by which the shower curtains are supported engage in the apertures of the curtains in a very narrow area, and the loading imposed on the shower curtains above the apertures and in alignment with the hooks is very high, and since the curtains in the area above the apertures are not sufficiently strong the apertures become elongated and then tear out thereby rendering the shower curtain useless.

SUMMARY OF THE INVENTION

With my invention a double reinforcement is applied to overlie and strengthen the top edge of the shower curtain and to overlie and strengthen the area above the portion of the apertures engaged by the hooks by which the curtain is secured on the shower curtain rod. Virtually all of the shower curtains in use have the upper edges of their apertures positioned approximately ⅜" to ½" from the top of the shower curtain, and it is therefore possible to provide a looped over protector having spaced apertures which align with opposite sides of each curtain holding aperture to strengthen the shower curtain above each of the apertures on opposite sides of the shower curtain. This protective and reinforcing member extends above and in alignment with the apertures so as to protect and strengthen the shower curtain in the area where the loading imposed on the shower curtain is the highest in alignment with the narrow hooks in the curtain apertures by which the shower curtain is supported.

These shower curtain protectors can be packaged in small packages containing a few of the reinforcement members so that they can be made readily available at modest pricing so that a shower curtain that begins to fray can be strengthened and repaired to extend its useful life over a much longer period of time.

One of the great disadvantages of the present curtains now used resides in the fact that once a few of the holes have become elongated and tear out the remainder of the holes are subjected to considerably higher loading which very quickly pull them out, and then the curtain is virtually useless. On occasion reinforcement strips have been positioned across the top fold of a shower curtain in an effort to strengthen the holding capabilities of the shower curtain in this area. These efforts have not proven to be satisfactory because they are bulky and make it difficult to push the curtain to one side when a person desires to enter the bathtub or shower stall or to exit therefrom.

DESCRIPTION OF THE PREFERRED EMBODIMENT

Figure 1:
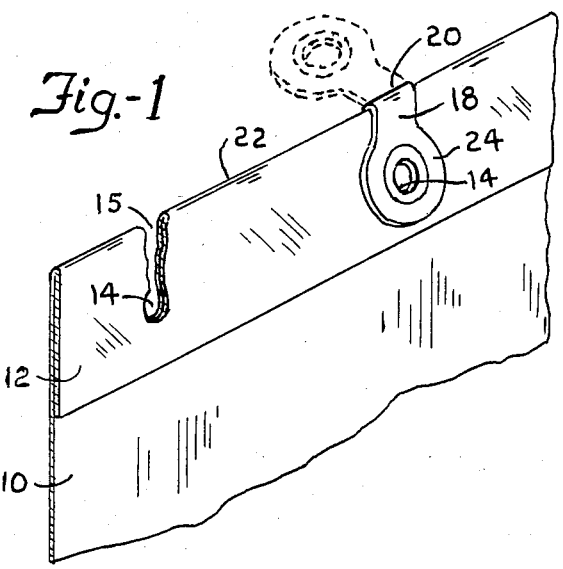
FIG. 1 is a fragmentary perspective view of the top portion of a shower curtain showing the condition when a curtain holding aperture tears out and illustrating one of the shower curtain reinforcing members being applied to a shower curtain.
Figure 4:
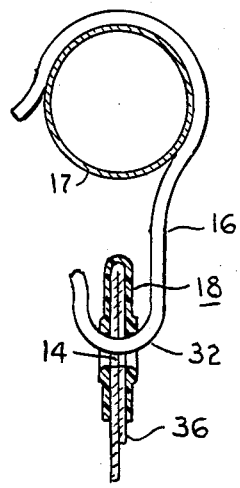
FIG. 4 is a fragmentary sectional view illustrating the loading that is imposed on a shower curtain by the curtain supporting hooks.

Referring now to the drawings, a fragmentary portion of a shower curtain 10 is illustrated in FIG. 1. The top edge 12 of the curtain is folded over to provide a thickened or reinforced section in which the hook receiving apertures 14 are positioned.

A relatively high loading is necessarily imposed on the shower curtain due to the fact that the hook which supports the curtain on the shower rod is very narrow. The internal diameter of the hook receiving apertures 14 is approximately ¼" to 5/16" in diameter, and the diameter of the hooks 16 is approximately ⅛" in diameter. The majority of shower curtains have 12 curtain supporting appertures through which hooks 16 project and support the curtains on the rod 17. It is thus apparent that the weight of the shower curtain is supported on twelve approximately ⅛" diameter hooks. The majority of the hooks are formed of round wire stock, and thus impose a relatively high loading on the curtain in the area of the apertures. The hooks being round imposed a relatively heavy loading on the curtain 10 because the rounded section of the hooks 16 exerts a concentrated loading on the inner circumference of the apertures 14. The loading on the curtain support is on occasion materially increased because occasionally a party taking a shower will grasp the curtain to steady themselves or to prevent falling, thus materially increasing the loading in the supporting apertures. The loading to which the shower curtain is subjected progressively distorts and elongates the apertures 14, and the apertures 14 eventually tear through the material of the shower curtain as illustrated at 15 in FIG. 1. When one of the apertures tears through the loading is increased in the other supporting apertures 14, and when a few of them are torn through and are thus rendered inoperable the hooks 16 pull through the remainder of the supporting apertures whereupon the curtain 10 is rendered inoperable.

To prevent the curtain supporting apertures 14 from becoming stressed by the weight of the curtain and otherwise and becoming elongated and eventually tearing out as shown in FIG. 1, I have devised a double reinforced member 18 which has a mid-section 20 which is adapted to overlie the top edge 22 of the shower curtain 10. The middle of the central area 20 will be positioned on the top edge 22 of the curtain. The member 18 has reinforcing and stiffening areas 24 and 26 surrounding apertures 28 and 30 adapted to overlie the hook receiving apertures 14 in the top edge of the shower curtain 10.

Figure 5:
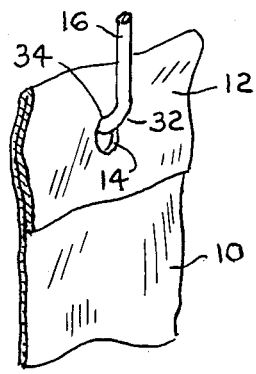
FIG. 5 is a fragmentary plan view illustrating the high loading that is imposed on the shower curtain apertures due to the narrow width of the supporting hooks.

The double reinforcement member 18 thus strengthens and protects the top reinforced edge 12 of the shower curtain 10 in the area where the high loading occurs as illustrated graphically in FIG. 5 above the apertures 14 with the engaging portions of the hooks 32 as shown at 34 where the narrow width 34 of the hooks 32 exerts a high unit loading on the shower curtain in the area 12 above the apertures 14. The reinforcement sections 24 of the double reinforcement member 18 engages the material 36 of the folded over area and strengthens it by adding reinforcing material 32 around the apertures 28 and 30. The apertures 28 and 30 of the reinforcement member 18 align with the hook receiving apertures 14 in the curtain. This reinforcement materially strengthens the curtain in the area where high unit loading on the material of the curtain 10 occurs immediately in line with the narrow area 34 of the hook supporting mechanism.

Figures 2, 3:
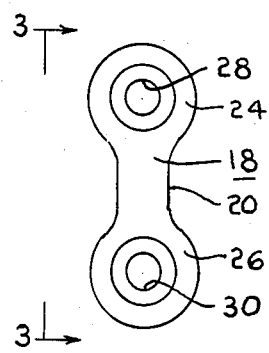
FIG. 2 is a plan view of a curtain reinforcing member.
FIG. 3 is a side elevation of the curtain reinforcing member taken substantially on the line 3—3 of FIG. 2, looking in the direction of the arrows.

The reinforcement sections 18 may have adhesive material on their backs so that when applied to the curtain as illustrated in FIG. 1 the reinforcing sections immediately adhere to the curtain and clamps the reinforcing member 18 securely in place. As illustrated in FIG. 3, a backing 40 is provided for the reinforcing section. This tab 40 is removed when it is desired to use the reinforcing members 18, and it will be noted that the reinforcing tabs 18 can be readily applied, and that it is unnecessary to have any marked degree of mechanical skill to install them because they can be positioned by anyone having minimal mechanical expertise.

Any suitable material may be used to form the reinforcing member 18. This material may, if desired, be a transparent plastic material so that the reinforcements can be applied to any colored material of which the shower curtain 10 is formed. If desired, it can be very thin but strong so as not to undesirably interfere with the bunching together of the curtain 10 on the rod 17 as when someone wants to enter or exit from the shower area.

Figure 6:
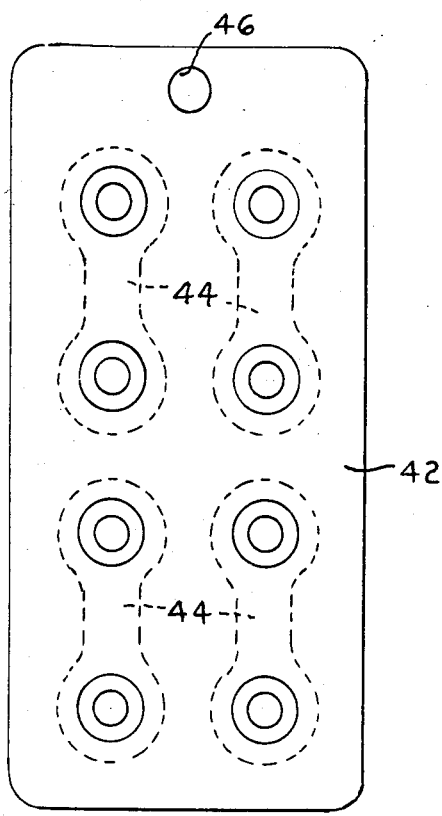
FIG. 6 is a plan view of a card having, for example, four shower curtain reinforcing members adapted to be punched out of the card and used as desired.

In commercializing this developement four or six reinforcing members 18 for example, can be formed of a transparent plastic or other material formed with perforated or punch out configurations, and having suitable punch out backing plates secured thereto, which can be peeled off when all is in readiness to apply the reinforcing members to the shower curtain. The backing member 40 may carry any necessary instructions to guide the purchaser in applying the reinforcing member to the shower curtain. As illustrated in FIG. 6, the card 42 may have a desired number of reinforcing members 44 formed with perforated edges so that the individual members 44 can be removed from the card 42 and used to repair the shower curtain. The card 42 may have an aperture 46 by which the card can be located on a board positioned in any desired location for display and sale such for example as near a check out counter in a supermarket or other store. The card 42 having several reinforcing members 18 thereon can also be advantageously commercialized by "mail order" merchandising.

I claim:

1. The method of reinforcing a supporting aperture in a shower curtain comprising:
   (a) providing a shower curtain having along a top edge thereof a reverse fold of the curtain to provide a folded region, and a series of supporting apertures in said folded region,
   (b) providing a reinforcement member, said reinforcement member comprising a thin transparent plastic member having two apertures separated by a central uninterrupted area, a layer of adhesive on one side of the plastic member, and a removable back tab overlying the adhesive,
   (c) removing the back tab from the reinforcing member,
   (d) positioning the central uninterrupted area of the reinforcement member on the top edge the curtain at one of the supporting apertures,
   (e) adhering the reinforcement member to both sides of the curtain adjacent the top edge of the curtain so as to align the apertures in the reinforcement member with a supporting aperture in the shower curtain.

* * * * *